United States Patent
Blandy et al.

(10) Patent No.: US 6,779,188 B1
(45) Date of Patent: Aug. 17, 2004

(54) APPARATUS AND METHOD FOR IMPROVED DEVIRTUALIZATION OF METHOD CALLS

(75) Inventors: Geoffrey Owen Blandy, Austin, TX (US); Andrew Johnson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 09/671,876

(22) Filed: Sep. 28, 2000

(51) Int. Cl.[7] .............................. G06F 3/00; G06F 9/44; G06F 9/46; G06F 13/00

(52) U.S. Cl. ...................... 719/331; 719/332; 717/148; 717/153; 717/165

(58) Field of Search ............................... 709/310–332; 717/148, 153, 167

(56) References Cited

U.S. PATENT DOCUMENTS 6,151,703 A * 11/2000 Crelier ........................ 717/136
6,385,660 B2 * 5/2002 Griesemer et al. ........... 709/315

OTHER PUBLICATIONS

Fernandez, Simple and Effective Link–Time Optimization of Modula–3 Programs, Nov. 7, 1994, pp. 1–7.*
Ishizaki et al., Design, Implementation, and Evaluation of Optimizations in a Just–In–Time Compiler, ACM, Jun. 1999, pp. 119–122.*

* cited by examiner

*Primary Examiner*—Thomas Lee
*Assistant Examiner*—Diem Cao
(74) *Attorney, Agent, or Firm*—Duke W. Yee; Volel Emile; Stephen R. Tkacs (57) ABSTRACT

Apparatus and methods are provided for improving devirtualization of method calls. The apparatus and methods reduce the amount of processing time used in performing lookups of methods by limiting such lookups to calls of methods that have been either overridden or overloaded. If a method has not been overridden or overloaded, a branch to the compiled method code is directly taken. If a method has been overridden or overloaded, a lookup routine is executed for looking-up the appropriate method to be invoked on the passed object. The identification of whether to use a lookup routine may be performed in many different ways including providing an extra field in a method block of the method, inserting code into a prolog of the method, and the like.

33 Claims, 4 Drawing Sheets

APPARATUS AND METHOD FOR IMPROVED DEVIRTUALIZATION OF METHOD CALLS

RELATED APPLICATIONS

The present invention is related to commonly assigned and co-pending U.S. patent application Ser. No. 09/671,770 entitled "APPARATUS AND METHOD FOR AVOIDING DEADLOCKS IN A MULTITHREADED ENVIRONMENT", Ser. No. 09/671,973 entitled "APPARATUS AND METHOD FOR IMPLEMENTING SWITCH INSTRUCTIONS IN AN IA64 ARCHITECTURE", Ser. No. 09/671,877 entitled "APPARATUS AND METHOD FOR DETECTING AND HANDLING EXCEPTIONS", Ser. No. 09/671,771 entitled "APPARATUS AND METHOD FOR VIRTUAL REGISTER MANAGEMENT USING PARTIAL DATA FLOW ANALYSIS FOR JUST-IN-TIME COMPILATION", Ser. No. 09/671,873 entitled "APPARATUS AND METHOD FOR AN ENHANCED INTEGER DIVIDE IN AN IA64 ARCHITECTURE", Ser. No. 09/671,874 entitled "APPARATUS AND METHOD FOR CREATING INSTRUCTION GROUPS FOR EXPLICITLY PARALLEL ARCHITECTURES", and Ser. No. 09/671,875 entitled "APPARATUS AND METHOD FOR CREATING INSTRUCTION BUNDLES IN AN EXPLICITLY PARALLEL ARCHITECTURE", filed on even date herewith and hereby incorporated by reference.

BACKGROUND OF THE INVENTION

1. Technical Field

The present invention provides apparatus and methods for improved devirtualization of method calls. More specifically, the present invention provides apparatus and methods for performing lookups of appropriate methods to be invoked on objects only when it has been determined that the method has been overridden or overloaded.

2. Description of Related Art

Many Java method calls are virtual. This means that the target method of the site of a call is dependent on the object upon which the method is invoked. This dependency requires a lookup of the appropriate method to be invoked on the object. The lookup takes time and reduces performance. A Java just-in-time compiler can make method calls with less overhead if the method is not overloaded, i.e. if the method does not have an alternative method with the same name and signature, defined in a subclass of the class of the original method, to be used instead of the original method for objects of type of the subclass.

Thus, it would be beneficial to have apparatus and methods for performing a lookup of a method to be invoked which reduces the amount of time used to perform lookups. It would further be beneficial to have an apparatus and method for performing lookups only when they are necessary to finding an appropriate method to be invoked on an object.

SUMMARY OF THE INVENTION

Apparatus and methods are provided for improving devirtualization of method calls in Java. The apparatus and methods reduce the amount of processing time used in performing lookups of methods by limiting such lookups to calls of methods that have been either overridden or overloaded. If a method has not been overridden or overloaded, a branch to the compiled method code is directly taken. If a method has been overridden or overloaded, a lookup routine is executed for looking-up the appropriate method to be invoked on the passed object. The identification of whether to use a lookup routine may be performed in many different ways including providing an extra field in a method block of the method, inserting code into a prolog of the method, and the like.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
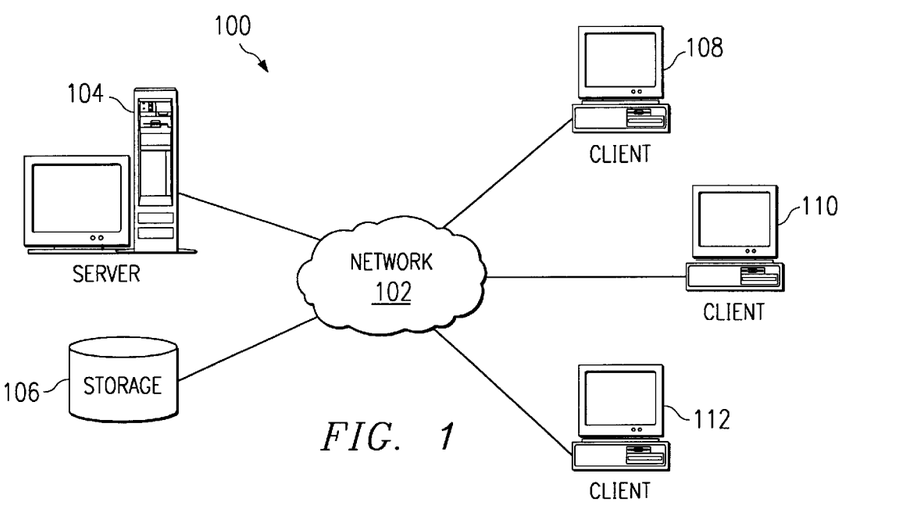
FIG. 1 is an exemplary block diagram of a distributed data processing system according to the present invention.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another.

At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

Figure 2A:
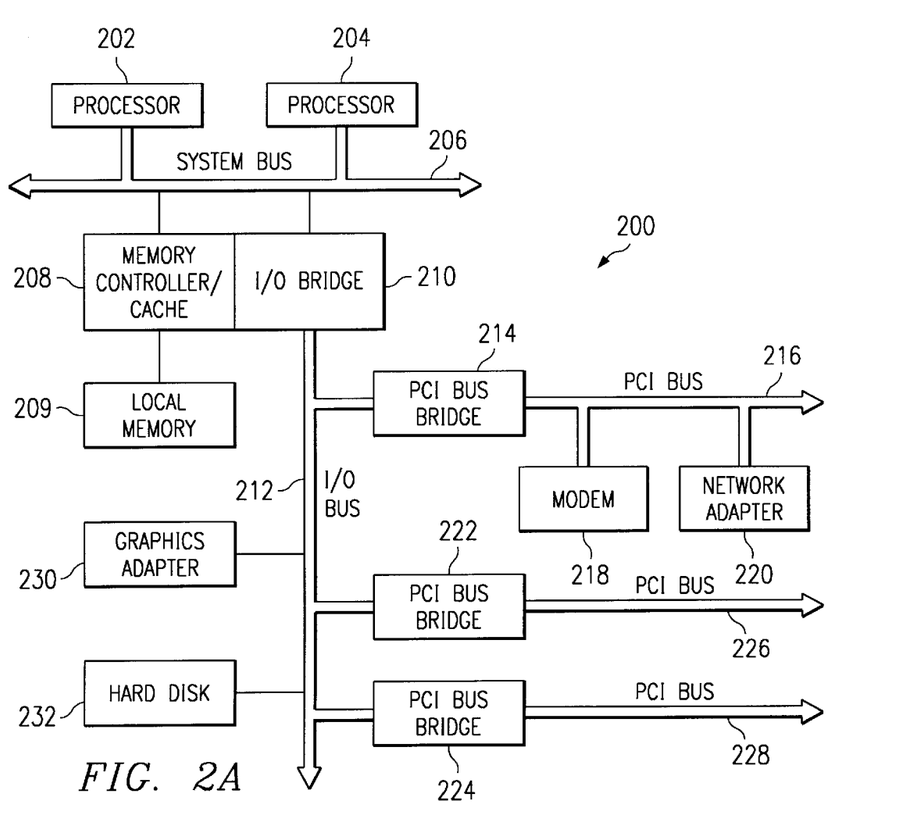
FIG. 2A is an exemplary block diagram of a data processing system according to the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
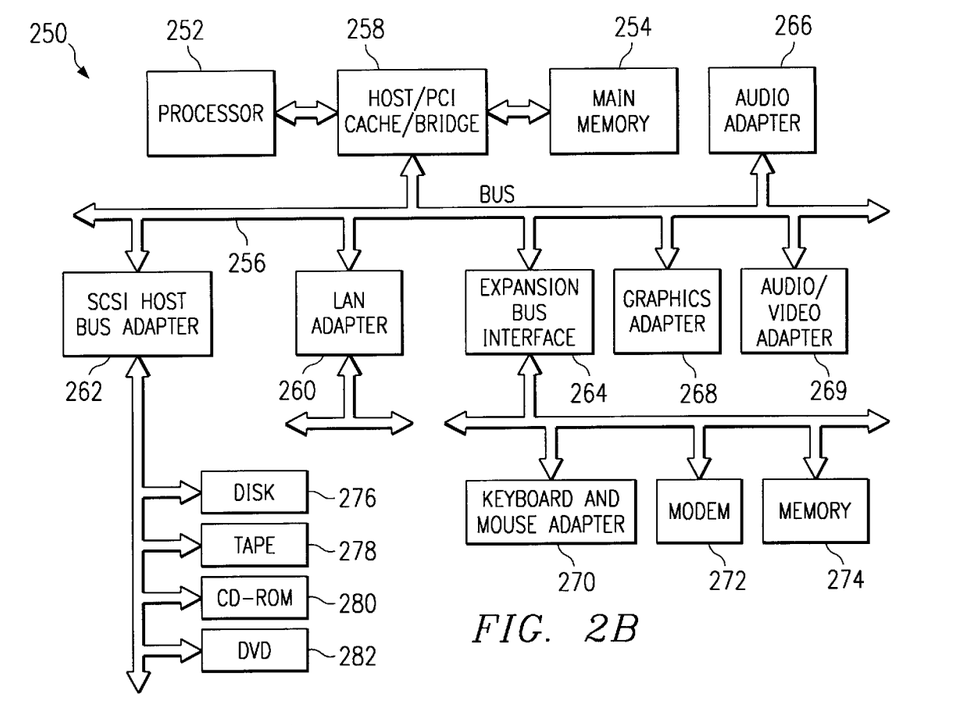
FIG. 2B is an exemplary block diagram of a data processing system according to the present invention.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as OS/2, which is available from International Business Machines Corporation.

An object oriented programming system such as Java may run in conjunction with the operating system and may provide calls to the operating system from Java programs or applications executing on data processing system 250. Instructions for the operating system, the object oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides an apparatus and method for improved devirtualization of method calls in a Just-In-Time (JIT) compiler. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications. In order to provide a context for the present invention, portions of the operation of a JVM according to Java specifications are herein described.

Figure 3A:
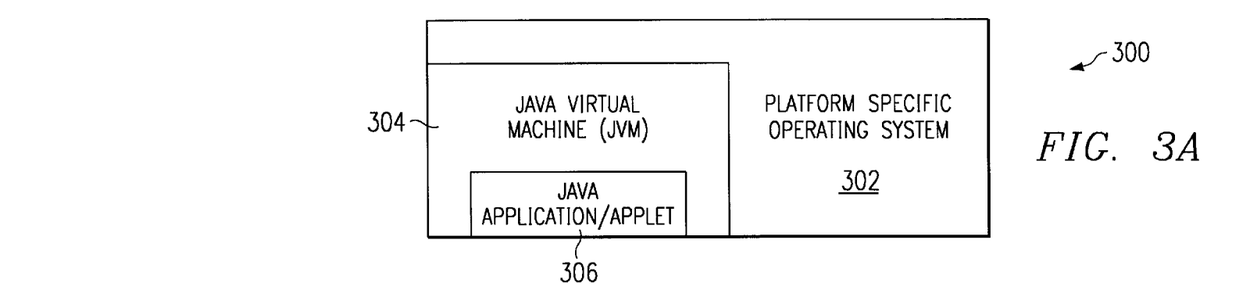
FIG. 3A is a block diagram illustrates the relationship of software components operating within a computer system that may implement the present invention.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded pico-Java core. At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system.

The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a Just-In-Time (JIT) compiler. With this type of execution, the bytecodes of a method are compiled to native machine code upon successful fulfillment of some type of criteria for "jitting" a method. The native machine code for the method is then cached and reused upon the next invocation of the method. The execution engine may also be implemented in hardware and embedded on a chip so that the Java bytecodes are executed natively. JVMs may interpret bytecodes or use other techniques, such as Just-In-Time compiling, to execute bytecodes. It is not uncommon for a JVM to interpret some methods and Just-In-Time compile others.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 3B:
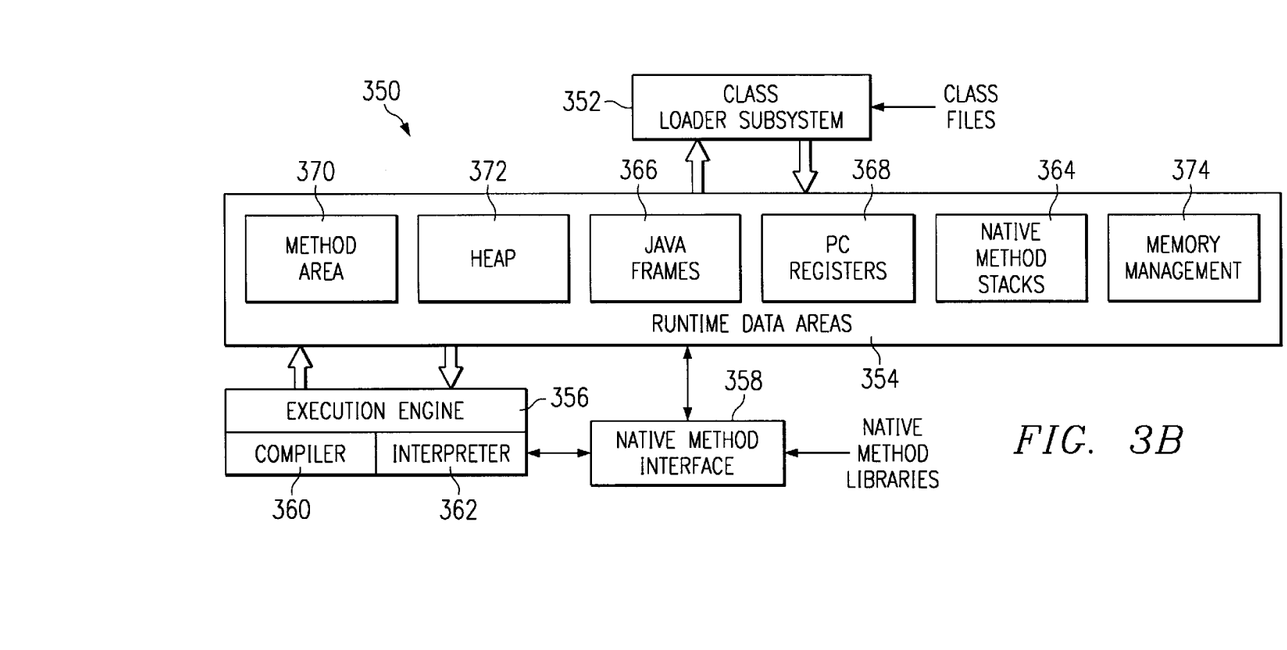
FIG. 3B is an exemplary block diagram of a Java Virtual Machine (JVM) according to the present invention.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java frames 366, PC registers 368, method area 370, and heap 372. These different data areas represent the organization of memory needed by JVM 350 to execute a program.

Java frames 366 are used to store the state of Java method invocations. When a new thread is launched, the JVM creates a new Java stack from which the thread will allocate Java Frames. A thread is a part of a program, i.e. a transaction or message, that can execute independently of other parts. In a multithreaded environment, multiple streams of execution may take place concurrently within the same program, each stream processing a different transaction or message.

A Java frame contains all the information pertaining to a single method invocation and is commonly partitioned into three regions. The first region holds all local variables including the input parameters. The second region is typically fixed in size and contains various pointers used by the interpreter including a pointer to the previous frame. The third region is the Java operand stack which is a FIFO stack that holds operands and results of bytecode operations. The operand stack is also used to pass parameters during invocation. The JVM performs only two operations directly on Java operand stacks: it pushes and pops stack items. These items may be object references or primitives such as integers or floating point values.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java frames 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory. Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

A Java class is a user-defined data type that defines a collection of objects that share the same characteristics. An object, or class member, is one instance of the class. An object is a self-contained module of data and its associated processing. Objects have associated methods which contain executable code that can operate on that object, other objects and static data.

The following discussion on method blocks and method tables is based on specific JVM implementations such as those from Sun and IBM. The use of these structures is neither required nor precluded by the Java Virtual Machine Specification.

In most JVM implementations, each method has an associated method block. The method block contains information about the method such as the starting address of its code and the type and number of parameters it requires. Typically, the addresses of all the method blocks associated with a given class are arranged in an array known as a method table. When objects are instantiated, the class's method table is associated with the object for example by placing the address of the method table in a header field that prefixes the object. The method table can subsequently be used to perform method lookup as required when a virtual method is invoked with regard to an object.

The method table is created when a class is loaded, and contains addresses of method blocks for both inherited methods and any methods introduced by the loaded class. Within each method block for a virtual method is a field which identifies the offset into a method table where the method block address may be located.

Java methods may be overridden or overloaded. Overriding a method involves a programmer writing his/her own version of a method having the same name and signature as the original method. Where the signature defines the type and number of parameters that are passed to the method. In such a case, when the class's method table is created it will contain the address of the method block for the new method at the offset where the overridden method's block's address would otherwise appear.

Many Java method calls are virtual. This means that the target method of the site of a call is dependent on the object upon which the method is invoked. For JVM implementations such as those described above, the lookup procedure is as follows:

1) The method block offset is fetched from the method block that is provided as an operand to the invokevirtual bytecode.
2) The method table address is fetched from the object header for "this".
3) The method block address is fetched from the method table using the offset as an index into the method table.

The lookup takes time and reduces performance. A Java just-in-time compiler can make method calls with less overhead if the method is not overloaded.

For example, consider the following portion of Java code:

```
class A {
    int m() {
        return 3;
    }
}
class B extends A {
}
class Y {
    public static C getC() {
        ...
    }
}
class X {
    int testing() {
        B x = y.getC();
        x.m();        //  this will be encoded by the Java
                      //  compiler as a call, to A.m(), with the
                      //  understanding that
                      //  a virtual method lookup will be done at
                      //  runtime as required.
    }
}
```

At the call site, x.m( ), the method A.m( ) is invoked on object x. In order to invoke the method on object x, the object type is determined, a method table corresponding to the method is loaded, a method for that object type is identified and a corresponding offset into the method table is obtained from the method block, and the instructions identified by the method start address in the method table are then executed. This lookup of the object type and the associated method 'm' takes time.

The present invention reduces the lookup time required by not requiring that the "correct" method be looked up each time a method is invoked. The present invention limits the lookup of a method to only those methods that have been overridden. The compiled code of methods that are not overridden may be executed directly without having to perform a lookup.

Figure 4:
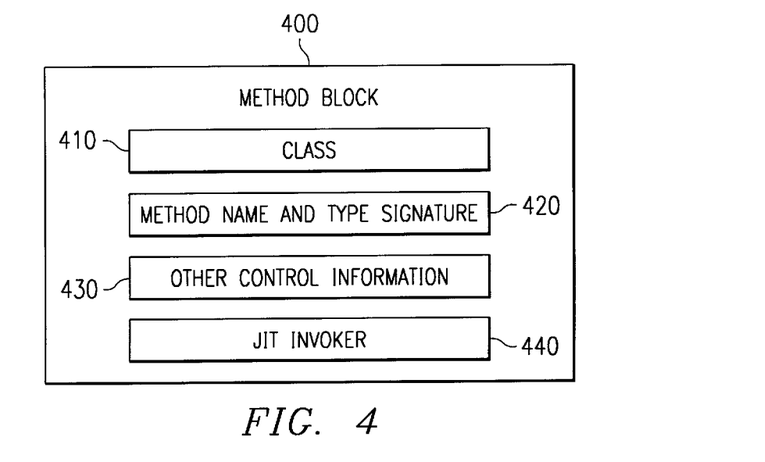
FIG. 4 is an exemplary block diagram of a method block in accordance with the present invention.

As mentioned above, each method has a method block associated with it. FIG. 4 is an exemplary diagram of a method block in accordance with the present invention. As shown in FIG. 4, the method block holds the class 410, the method name and type signature 420, and other control information 430. The present invention extends this method block to have a field holding a Just-In-Time (JIT) invoker 440 for the method. The JIT invoker 440 is the address of code to be called to run this method. Some possible values for the JIT invoker field 440 include:

1) compileFromJIT—before the target method has been compiled the invoker points to the compiler;
2) compiledCode—the actual compiled code; and
3) lookUp—Another class, which extends the class of this method, has overridden this method, so this call must ensure that the correct method is branched to.

In one exemplary embodiment of the present invention, it is initially presumed that the method will not be overridden and that the method block to use is the method block encoded at the call site by the Java compiler, rather than looking up the "correct" method block every time from the object. If the method is a normal virtual method then, if it has not yet been overridden, the invoker can point directly to the executable code for the method. No other methods yet exist which override this method, so going to the method without looking at the object is a safe option.

For example, initially when a method, testing( ), is compiled, method m in class A has not been overridden by any class. It has not been compiled either, so the method block JIT invoker field 440 for A.m( ) points to compileFromJIT. Once method A.m( ) has been compiled then the JIT invoker field 440 points directly to the compiled code for method A.m( ) as method m has not been overridden by any class.

As described above, once a class has been loaded which has a method which overloads this method, then there is a possibility of an object of this new type being used at the call site. The present invention provides a mechanism by which a correct method may be determined while minimizing lookup time based on a determination of whether a method has been overridden or not.

With the present invention, a JIT invoker field is utilized to determine if a method has been overridden. The value in the JIT invoker field identifies whether the method has been compiled and whether the method has been overridden. If the method has not been compiled, the JIT invoker field points to a routine to compile the method. If the method has been compiled and has not been overridden, the JIT invoker field points to the compiled method code. If the method has been overridden, the JIT invoker field points to a lookup routine for looking-up the appropriate version of the method. The JIT compiler changes the value of the JIT invoker field in response to compilation of the method and a subsequent version of the method being instantiated.

When a class is loaded, for example, the JVM notifies the JIT that the class has been loaded. The JIT looks at the methods of the class to determine if any of he methods override an existing method. If so, the JIT identifies the overridden methods and changes their JIT invoker field 440 to point to the lookup routine which looks-up the correct method to be invoked when there is a call to the method.

Consider the following code for calling a method:

```
mov    r20=[out0],-jitinvoker_offset   // out0 has been set up with the
                                        method block address of
                                        A.m()+jitinvoker_offset
;;
mov    b6 = r20
br.call b0=b6                           // call the method
If the following class C is loaded:
class C extends B {
    int m() {
        return 4;
    }
}
then method A.m() has been overloaded so the JIT invoker
field 440 for A.m() is changed to point to a lookup
routine. The lookup routine may take the form of, for
example:
Lookup an overridden method block
    r32 = method block
    r33 = object
mbLookup:
    ld8    r14 = [r33]              //m method table of
object
    adds   r15 = mb_fb_offset, r32  //a @ offset into
methodTable
    ;;
    ld4    r15 = [r15]              //m offset of the mb
in the methodTable
    adds   r14 = mt_methods, r14    //a bump by
classblock field of methodTable
    ;;
    shladd r17 = r15, 3, r14        //a address of mb
    ;;
    ld8    r19 = [r17]              //m the target mb
    ;;
    adds   r16 = mb_CompiledCode, r19  //a address of
target
    ;;
```

-continued

```
    ld8    r18 = [r16]              //m address of
target
    ;;
    mov    b6 = r18                 //0
    add    r32 = r19, r0            //a move mb to r32
    br.cond. dptk b6
```

Of course, other types of lookup routines may be used without departing from the spirit and scope of the present invention.

It might seem that the JIT invoker field for C points to the lookup routine as well. This is not necessary, however, because if there is a call site which refers to C.m( ) then the Java compiler has determined that the object must be of type C or a subclass of C. As the object is of type C then method m must resolve to C.m( ). If class C were overloaded by another class implementing m( ) then the JIT invoker field 440 for C.m( ) would have to be changed to point to the lookup routine as well.

In another exemplary embodiment of the present invention, it is presumed that a method will not be overloaded and thus, that it is safe to normally branch straight to the compiled method code. To allow for the method to be overloaded, once a method has been overloaded, a call to a lookup routine is patched into the beginning of the method code, e.g., into the prolog of the method code. The call to the lookup routine is patched by the JIT when it is notified by the JVM that a class has been loaded and the JIT detects that the class implements a method which overrides an existing method that does not already have a call to the lookup routine in the prolog.

Thus, if a method has not been overloaded, the method prolog will not have the code for calling the lookup routine and a normal branch to the compiled method code is performed. However, if the method has been overloaded, the method prolog will have the code for calling a lookup routine and the lookup routine will be executed before branching to an appropriate version of the method.

In addition, a flag in the prolog may be provided so that the lookup routine is not executed every time the method is invoked for the object. Once a lookup for the object is performed, the flag may be set such that the lookup is not performed during subsequent calls to the method for the same object.

Thus, when a method is called and the method prolog includes inserted code that calls a lookup routine, the lookup routine is executed first. The lookup routine determines the correct method to call for the object being passed. The lookup routine then calls the correct routine, resetting the flag preventing the lookup code from being called a second time.

An example of the insertion of code in the beginning of a method is as follows:

Initial method:
methodA:
    alloc r40=8,16,4
    mov r41=b0
    nop.b cmp.eq p3,p0=r0,,r0 // set the flag read for any further
        method calls in this method.

After lookup is required:

```
methodA:
       alloc     r40=8,16,4
       mov       r41=b0
(p3)   br.dpnt   lookUp       //  call the lookup routine
                              //  the lookup routine will clear flag
                                  p3 before calling the target
                                  method, stopping the target
                                  method from branching to
                                  lookup again.
       cmp.eq    p3,p0=r0,r0  //  set the flag
```

The actual call to a method can now be a direct branch since the prolog of the method will now handle any overriding of the method such that the appropriate method is called:

br.call.sptk methodA

Figure 5:
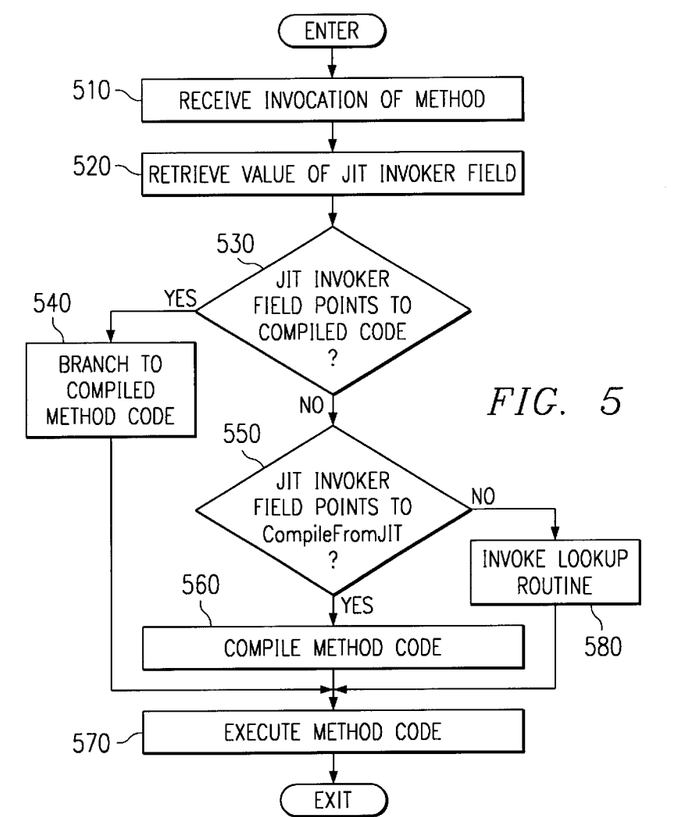
FIG. 5 is a flowchart outlining an exemplary operation of a first preferred embodiment of the present invention.

FIG. 5 is a flowchart outlining an exemplary operation of the present invention according to a first preferred embodiment. As shown in FIG. 5, the operation starts with receiving an invocation of a method (step 510). The value of the JIT invoker field is retrieved from the method block (step 520). A determination is made as to whether the JIT invoker field points to the compiled method code (step 530). If so, a branch to the compiled method code is executed (step 540).

If the JIT invoker field does not point to the compiled method code, a determination is made as to whether the JIT invoker field points to a CompileFromJIT routine (step 550). If so, the method code is compiled and the JIT invoker field is changed to point to the compiled code (step 560). The compiled method code may then be executed (step 570).

If the JIT invoker field does not point to CompileFromJIT and does not point to the compiled method code, the JIT invoker field must point to a lookup routine. The lookup routine is invoked and an appropriate version of the method is invoked (step 580). The operation then ends.

Figure 6:
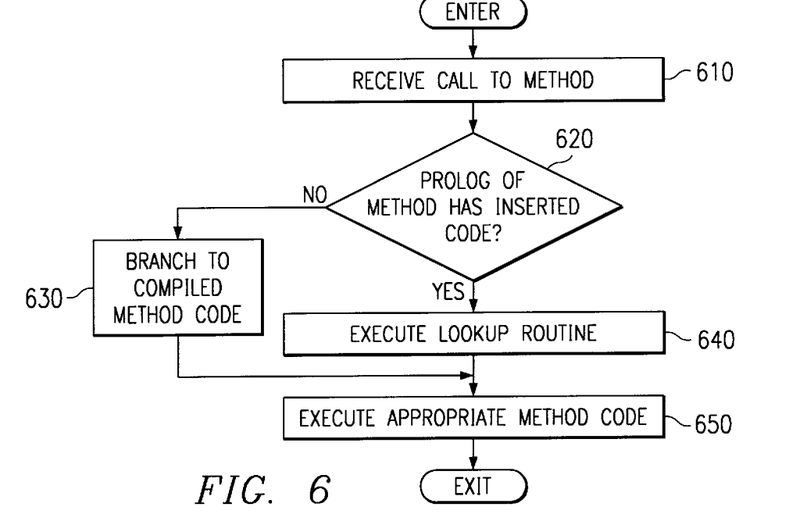
FIG. 6 is a flowchart outlining an exemplary operation of a second preferred embodiment of the present invention.

FIG. 6 is a flowchart outlining an exemplary operation of a second preferred embodiment of the present invention. As shown in FIG. 6, the operation starts with a call to a method being received (step 610). The prolog of the method is then examined for inserted code that calls a lookup routine (step 620). If the code that calls a lookup routine is not present, a branch to the compiled method code is executed (step 630). If the code that calls a lookup routine is present in the prolog of the method, the lookup routine is executed (step 640) and an appropriate version of the method is invoked on the object passed (step 650). The operation then ends.

Thus, the present invention provides a mechanism by which overriding of methods may be detected and handled such that a correct version of the method is called. The present invention, in a first preferred embodiment, makes use of a JIT invoker field to identify when to invoke a lookup routine to lookup the actual method to invoke. In a second preferred embodiment, the present invention makes use of a lookup routine call inserted in a prolog of a method.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for efficiently calling a method at runtime in a Just-In-Time (JIT) compiler, the method comprising:

receiving a call to a method at runtime;

responsive to the call to the method at runtime, determining if the method has been compiled and overridden;

if the method has been compiled and not overridden, branching to the compiled method;

looking-up an appropriate version of the method using a lookup routine if the method has been overridden and not compiled; and compiling the method if the method has not been overridden and is not compiled.

2. The method of claim 1, wherein determining if the method has been overridden includes identifying a pointer of a Just-In-Time (JIT) compiler invoker field of a method block associated with the method.

3. The method of claim 2, wherein identifying a pointer of a JIT compiler invoker field includes determining if the pointer of the JIT compiler invoker field points to the lookup routine.

4. The method of claim 2, wherein the pointer of the JIT compiler invoker field points to a routine to compile the method if the method has not yet been compiled.

5. The method of claim 2, wherein the pointer of the JIT compiler invoker field points to compiled code of the method if the method has been compiled and has not been overridden.

6. The method of claim 2, wherein the pointer of the JIT compiler invoker field is set by the JIT compiler in response to being informed of loading of a class.

7. The method of claim 1, wherein determining if the method has been overridden includes determining if a call to the lookup routine is included in a prolog of the method.

8. The method of claim 7, wherein the call to the lookup routine is included in the prolog of the method when a Just-In-Time (JIT) compiler is notified that a class that implements a version of the method that overrides the method is loaded.

9. The method of claim 7, further comprising setting a flag in the prolog to execute the lookup routine.

10. The method of claim 7, further comprising calling the appropriate version of the method identified by the lookup routine.

11. The method of claim 2, further comprising calling the appropriate version of the method identified by the lookup routine.

12. An apparatus for efficiently calling a method at runtime in a JIT compiler, the apparatus comprising:

means for receiving a call to a method at runtime;

means, responsive to the call to the method at runtime, for determining if the method has been compiled and overridden;

means for branching, if the method has been compiled and not overridden, to the compiled method;

means for looking-up an appropriate version of the method using a lookup routine if the method has been overridden; and means for compiling the method if the method has not been overridden and has not been compiled.

13. The apparatus of claim 10, wherein the means for determining if the method has been overridden includes means for identifying a pointer of a Just-In-Time (JIT) compiler invoker field of a method block associated with the method.

14. The apparatus of claim 13, wherein the means for identifying a pointer of a JIT compiler invoker field includes means for determining if the pointer of the JIT compiler invoker field points to the lookup routine.

15. The apparatus of claim 13, wherein the pointer of the JIT compiler invoker field points to a routine to compile the method if the method has not yet been compiled.

16. The apparatus of claim 13, wherein the pointer of the JIT compiler invoker field points to compiled code of the method if the method has been compiled and has not been overridden.

17. The apparatus of claim 13, wherein the pointer of the JIT compiler invoker field is set by the JIT compiler in response to being informed of loading of a class.

18. The apparatus of claim 10, wherein the means for determining if the method has been overridden includes means for determining if a call to the lookup routine is included in a prolog of the method.

19. The apparatus of claim 18, wherein the call to the lookup routine is included in the prolog of the method when a Just-In-Time (JIT) compiler is notified that a class that implements a version of the method that overrides the method is loaded.

20. The apparatus of claim 18, further comprising means for setting a flag in the prolog to execute the lookup routine.

21. The apparatus of claim 18, further comprising means for calling the appropriate version of the method identified by the lookup routine.

22. The apparatus of claim 13, further comprising means for calling the appropriate version of the method identified by the lookup routine.

23. A computer program product in a computer readable medium for efficiently calling a method at runtime in a JIT compiler, comprising:

first instructions for receiving a call to a method at runtime;

second instructions, responsive to the call to the method at runtime, for determining if the method has been compiled and overridden;

third instructions for branching, if the method has been compiled and not overridden, to the compiled method;

fourth instructions for looking-up an appropriate version of the method using a lookup routine only if the method has been overridden; and fifth instructions for compiling the method if the method has not been overridden and has not been compiled.

24. The computer program product of claim 23, wherein the second instructions for determining if the method has been overridden includes instructions for identifying a pointer of a Just-In-Time (JIT) compiler invoker field of a method block associated with the method.

25. The computer program product of claim 24, wherein the instructions for identifying a pointer of a JIT compiler invoker field includes instructions for determining if the pointer of the JIT compiler invoker field points to the lookup routine.

26. The computer program product of claim 24, wherein the pointer of the JIT compiler invoker field points to a routine to compile the method if the method has not yet been compiled.

27. The computer program product of claim 24, wherein the pointer of the JIT compiler invoker field points to compiled code of the method if the method has been compiled and has not been overridden.

28. The computer program product of claim 24, wherein the pointer of the JIT compiler invoker field is set by the JIT compiler in response to being informed of loading of a class.

29. The computer program product of claim 23, wherein the second instructions for determining if the method has been overridden includes instructions for determining if a call to the lookup routine is included in a prolog of the method.

30. The computer program product of claim 29, wherein the call to the lookup routine is included in the prolog of the method when a Just-In-Time (JIT) compiler is notified that a class that implements a version of the method that overrides the method is loaded.

31. The computer program product of claim 29, further comprising fourth instructions for setting a flag in the prolog to execute the lookup routine.

32. The computer program product of claim 29, further comprising fourth instructions for calling the appropriate version of the method identified by the lookup routine.

33. The computer program product of claim 24, further comprising fourth instructions for calling the appropriate version of the method identified by the lookup routine.

* * * * *